United States Patent
Buhlheller et al.

(10) Patent No.: US 7,741,800 B2
(45) Date of Patent: Jun. 22, 2010

(54) CONTROL APPARATUS AND METHOD FOR CONTROLLING AN ADJUSTING DEVICE IN A MOTOR VEHICLE

(75) Inventors: Jürgen Buhlheller, Hainert (DE); Wolfgang Übel, Weitramsdorf (DE)

(73) Assignee: Brose Fahrzeugteile GmbH & Co. Kommanditgesellschaft, Coburg (DE)

( * ) Notice: Subject to any disclaimer, the term of this patent is extended or adjusted under 35 U.S.C. 154(b) by 517 days.

(21) Appl. No.: 11/571,141

(22) PCT Filed: Jun. 29, 2005

(86) PCT No.: PCT/EP2005/007012
§ 371 (c)(1),
(2), (4) Date: Feb. 7, 2007

(87) PCT Pub. No.: WO2006/002899
PCT Pub. Date: Jan. 12, 2006

(65) Prior Publication Data
US 2008/0272726 A1    Nov. 6, 2008

(30) Foreign Application Priority Data
Jun. 30, 2004 (DE) .................. 20 2004 010 211 U

(51) Int. Cl.
*H02P 7/00* (2006.01)
(52) U.S. Cl. .................. 318/432; 318/603; 318/607
(58) Field of Classification Search .................. 318/432, 318/434, 800, 798, 603, 604, 607
See application file for complete search history.

(56) References Cited

U.S. PATENT DOCUMENTS 4,924,166 A * 5/1990 Roussel ..................... 318/608
5,033,835 A * 7/1991 Platzer, Jr. .................. 359/877

(Continued)

FOREIGN PATENT DOCUMENTS

DE    43 15 637 A1    11/1994

(Continued)

OTHER PUBLICATIONS

Translation of International Publication No. WO 2006/002899, published Jan. 12, 2006.

*Primary Examiner*—Rina I Duda
(74) *Attorney, Agent, or Firm*—White & Case LLP

(57) ABSTRACT

A control apparatus for an adjusting device in a motor vehicle is provided. The apparatus has a sensor, particularly a current sensor ($S_1$), for generating a signal ($U_1$ to $U_{10}$, $I_1$ to $I_3$, $\Delta t_1$ to $\Delta t_8$) which is dependent on a motor movement by a motor in the adjusting device. The apparatus also has a power driver for controlling a motor current, and a processor (RE). The processor is designed and set up (i) to find a position ($x_m$) from the sensor signal ($U_1$ to $U_{10}$, $I_1$ to $I_3$, $\Delta t_1$ to $\Delta t_8$), particularly from the ripple in the motor current, (ii) to associate a reference characteristic ($Ch_{ref}$) of orderly signals ($U_1$ to $U_{10}$, $I_1$ to $I_3$, $\Delta t_1$ to $\Delta t_8$) from the sensor, particularly for the ripple, with a reference position ($x_{ref}$), (iii) to correct the position found ($x_m$) on the basis of the reference characteristic ($Ch_{ref}$) and the reference position ($x_{ref}$), and (iv) to control the motor current on the basis of the corrected position.

20 Claims, 3 Drawing Sheets

U.S. PATENT DOCUMENTS

| | | | |
|---|---|---|---|
| 5,050,977 A * | 9/1991 | Platzer, Jr. | 359/866 |
| 5,780,988 A | 7/1998 | Kalb et al. | |
| 5,963,001 A | 10/1999 | Peter et al. | |
| 6,134,840 A | 10/2000 | Pleiss | |
| 6,236,176 B1 | 5/2001 | Uebelein et al. | |
| 6,688,043 B1 | 2/2004 | Feder et al. | |
| 2002/0180389 A1 | 12/2002 | Filgueiras | |
| 2003/0122515 A1 | 7/2003 | Lutter et al. | |

FOREIGN PATENT DOCUMENTS

| | | |
|---|---|---|
| DE | 197 11 979 A1 | 10/1998 |
| DE | 198 02 478 A1 | 8/1999 |
| EP | 0 359 853 B1 | 2/1993 |
| WO | WO 98/50658 | 11/1998 |
| WO | WO 2006/002899 | 1/2006 |

\* cited by examiner

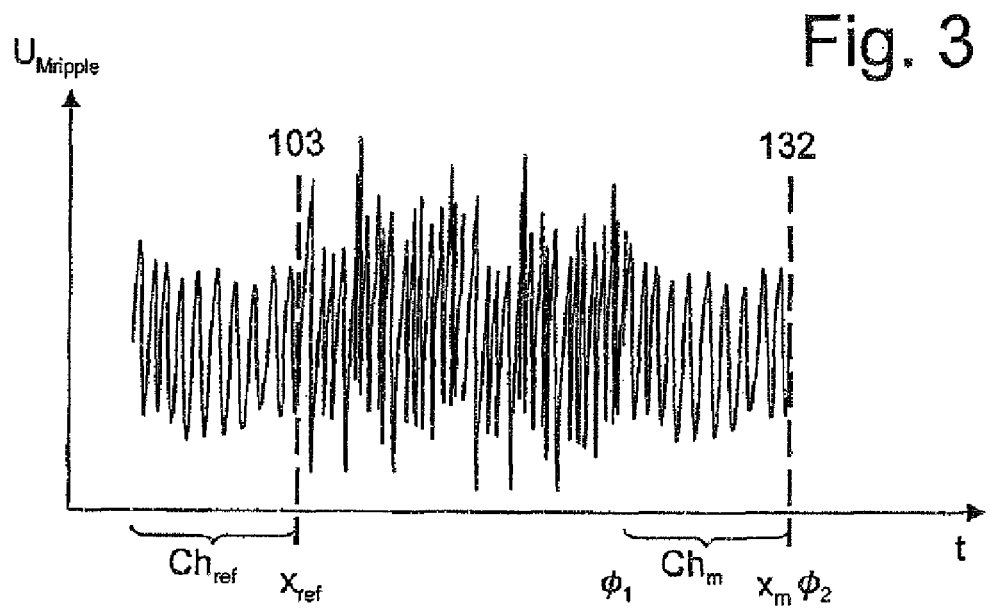
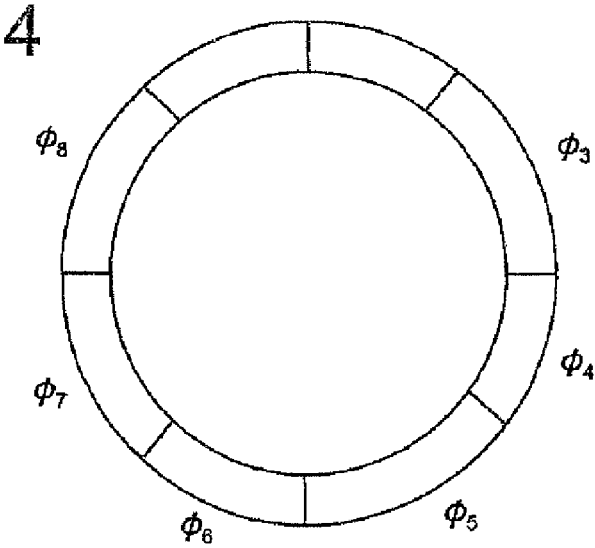
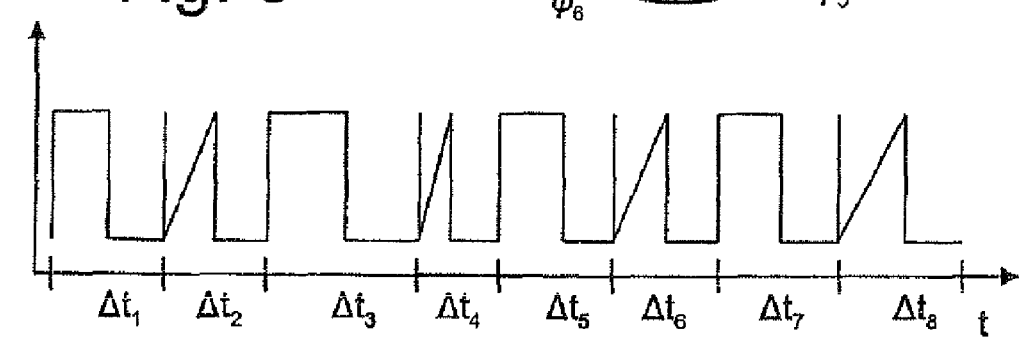

CONTROL APPARATUS AND METHOD FOR CONTROLLING AN ADJUSTING DEVICE IN A MOTOR VEHICLE

FIELD OF THE INVEVTION

The invention relates to a control apparatus and a method for controlling an adjusting device in a motor vehicle.

BACKGROUND OF THE INVENTION

Indirect-recognizing antitrapping systems for adjusting devices in motor vehicles are known from DE 30 43 118 A1, EP 0 359 853 B1, DE 43 15 637 A1 and DE 197 11 979 A1, for example. These systems are called indirect-recognizing because an object being trapped is not recognized directly at the location at which it happens (such as when using an electric terminal board laid along the closing contour), but rather as a result of the reaction of this occurrence via the adjusting system's power chain on the drive, which is operatively connected to a sensor. In some types of embodiment, the motor's drive shaft has an annular magnet mounted on it which generates signals in an associated Hall sensor which are in turn assessed in an electronic control apparatus. Should an instance of trapping arise then it can be expected that the adjusting movement of the adjustable part (e.g. a window pane) will be characteristically slowed down, which also slows down the drive via the mechanical coupling. This extends the time periods between two successive (Hall) signals. If a stipulated limit value is exceeded, the drive is stopped by the control device and if appropriate the direction of rotation is reversed in order to resolve the trapped condition again.

Such antitrapping or injury prevention systems are in use for adjustment kinematics for window lifters, in which the gear ratio between the drive and the adjustable part (window pane) remains constant. One example of this is single-strand or double-strand cord window lifters with an essentially linear track, as disclosed by way of example in DE 198 02 478 A1 and WO 98/50658. In principle, any alteration in the dynamics of the adjusting process or with respect to the forces occurring which is recognized by the electronic injury prevention system needs to be associated with an external action in this case, and therefore—when prescribable limit values are exceeded—an instance of trapping must be inferred.

SUMMARY OF THE INVENTION

The invention is based on the object of specifying improved options for controlling an adjusting device in a motor vehicle which improve the operability of the adjusting device as far as possible and avoid malfunctions as far as possible.

The object is achieved by the features of the independent claims. Advantageous developments of the invention are specified in the subclaims. To develop the invention, the features of the subclaims are also combined particularly advantageously with one another and with features of the indicated prior art.

Accordingly, the invention specifies a control apparatus and a method for controlling an adjusting device in a motor vehicle by virtue of the control being effected on the basis of a position which is found from a ripple in a motor current (ripple count) in the adjusting device. In this context, the ripple in the motor current is caused by the mechanical commutation. Position-dependent control is implemented for a window lifter, for example, where the control apparatus can use the position found to distinguish whether the window pane is entering a seal in the motor vehicle door or whether a body part belonging to a vehicle occupant is being squashed between the seal and the edge of the pane by the movement of the window pane.

To correct a possible positional error, a reference characteristic of orderly signals for the ripple is associated with a reference position. In this case, signals for the ripple can be understood to mean any types of information contained in the ripple, such as current or voltage values, changes therein over time, maxima, minima, reversal points, time intervals, periods or the like. An order for these occurring signals is not limited to these signals succeeding one another, and these signals may also occur in interleaved form in a defined order. This defined order for the signals forms the reference characteristic which is specific to the electric motor. The association between the reference position and this characteristic is preferably made such that a simple calculation can be performed. To this end, the reference position is preferably associated with the start or the end of the ascertained reference characteristic, that is to say with the first or last signal in time.

The position found is corrected on the basis of the reference characteristic and the reference position. For correction, the present value of the position found is preferably overwritten by a corrected value in a register, or possible difference values are added or subtracted.

In one preferred development of the invention, a present measurement characteristic and the reference characteristic are compared. In this case, the present measurement characteristic is determined by the present ascertained signals for the ripple, which preferably occur in the order stipulated in the reference characteristic. The correction is made if the present measurement characteristic and the reference characteristic can be associated with one another by means of the comparison. For the purpose of association, the measurement characteristic and the reference characteristic need to have a minimum degree of match. In this context, the required degree of match can be firmly prescribed. On the other hand, adaptation is preferably carried out by a control apparatus for the adjusting device on the basis of measured variables or parameters of the adjusting device.

In principle, various mathematical models are available for comparing the measurement characteristic and the reference characteristic. In one advantageous refinement of the invention, the measurement characteristic and the reference characteristic are cross-correlated. Preferably, the output value from the cross-correlation is subsequently compared with a comparison threshold value, and if the comparison is positive then the correction is made. Accordingly, regardless of the comparison function used, in a particularly advantageous development of the invention the measurement characteristic and the reference characteristic can be associated with one another if a value for matches between the measurement characteristic and the reference characteristic exceeds a particular threshold value.

In one development of the invention, the reference characteristic is continually updated. Updating involves the reference characteristic being adapted to suit changing ambient conditions for the adjusting device. In this context, the update is preferably made within an adjusting movement a plurality of times, advantageously each time, when a present measurement characteristic can be associated with the reference characteristic.

Preferably, updating involves associated measurement characteristics being aligned with the reference characteristic. In this case, a measurement characteristic is advantageously associated with a possible update whenever a minimum match is ascertained.

In principle, the reference characteristic can be formed from different information contained in the ripple. The text below specifies four preferred variants of the invention which can also be combined with one another.

In a first variant of this development of the invention, the reference characteristic has a number of voltage values and/or current values, preferably of peak current values for the orderly signals. By way of example, the current or voltage values can be ascertained at particular times. Preferably, however, the peak current values are ascertained as maxima in the profile of the ripple. An order for these peak current values then forms the reference characteristic.

In a second variant of this development of the invention, the reference characteristic has a number of integral values for the orderly signals. The integral values are preferably formed by integrating the current or voltage waveform of the ripple.

In a third variant of this development of the invention, the reference characteristic has a number of time intervals for the orderly signals. In this case, the time intervals are preferably formed by rising or falling edges which are ascertained from the ripple in the signal, for example by one or more threshold value comparisons.

In a fourth variant of this development of the invention, the reference characteristic has ratios for voltage values and/or current values and/or integral values and/or time intervals for the orderly signals. In this case, the ratios are preferably independent of a gain or of attenuation in the signal which can be caused by ambient influences.

In one particularly advantageous development of the invention, the position found is corrected on the basis of the length of the characteristic. By way of example, if the length of the reference characteristic corresponds to one full motor revolution then it is in turn preferably possible to associate a number of orderly signals, which advantageously correspond to a count difference for the position found, with this full motor revolution. The motor revolution is in turn associated with a particular adjusting path length by means of the mechanics of the adjusting device.

One advantageous refinement of this development of the invention allows the correction to be made by reducing the distance between the position found and the reference position by a multiple of the length of the characteristic. The definition of the length of the reference position preferably reveals that the length of the reference position corresponds to a count for the position found. By way of example, the length of the reference position corresponds to the number of metal contacts on the commutator and to the related number of counts for the position found. So as now to correct the position found, it is merely necessary to shift the position found by the remaining difference. To this end, the direction of the shift is advantageously derived from the arithmetic sign of the difference.

In one alternative refinement of the invention, the correction is made only in the event of a positive result from a plausibility check on at least the position found, the reference position and the length of the characteristic. This can reduce the likelihood of miscorrections.

Another aspect of the invention is a method, where the control is effected on the basis of a position which is found from a sensor signal which is dependent on a motor movement, preferably from a movement sensor in the adjusting device. In this case, this sensor signal is in turn specific to the drive. In this regard, a reference characteristic of orderly sensor signals is associated with a reference position, and the position found is in turn corrected on the basis of the reference characteristic and the reference position.

The invention comprises a control apparatus for an adjusting device in a motor vehicle, having a sensor, a power driver and a processor, which are designed and set up specifically. In particular, the sensor is a current sensor for generating a signal which is dependent on a motor movement by a motor in the adjusting device. The power driver is used to control a motor current. The processor is designed and set up accordingly to perform the functions of finding a position from the sensor signal, particularly from the ripple in the motor current, associating a reference characteristic of orderly signals from the sensor, particularly for the ripple, with a reference position, correcting the position found on the basis of the reference characteristic and the reference position, and controlling the motor current on the basis of the corrected position.

One advantageous development of the invention provides a differentiating element, particularly a high-pass filter or a bandpass filter, which is designed to filter out the DC component of the sensor signal in order, in particular, to determine from the filtered signal a measurement characteristic which is to be compared with the reference characteristic.

Another advantageous refinement of the invention has an analog-digital converter, with the sensor being connected to the analog-digital converter such that the unfiltered sensor signal, particularly its DC component, can be evaluated by the processor.

In combination with the previously presented correction of the adjusting position found, one advantageous development of the invention involves the position being found from a motor model. This motor model allows the adjusting position and the adjusting speed to be found on the basis of electromechanical parameters contained in the motor model. The input variable used for the motor model is a motor parameter. This is preferably the motor current, which is determined using a current sensor. In this case, the motor current is advantageously used to evaluate both the DC component and a ripple in the motor current, caused by commutation, as input variable for the motor model.

In this advantageous development of the invention, the ascertainment of the speed and/or the rotation angle, in the case of mechanically commutated DC motors, from the waveform of the ripple in the motor current which occurs during commutation is complemented and controlled by a motor state model, operating in parallel therewith, which forms the basis of the electromechanical motor equations. The motor current and the motor voltage are used to extrapolate a probable value for the present speed and preferably to determine an admissible nominal value range for the next commutation.

If it is not possible to determine a commutation time in the nominal value range, the extrapolated value is advantageously used. Otherwise, the present speed is determined accurately from the commutation time recorded by measuring the ripple in the nominal value range. The motor-specific and load-dependent variable which is required for the motor state model can be firmly prescribed or can respectively be adapted to suit the present speed, and learned, following the detection of commutation processes. Disturbances in recording and evaluating the ripple in the motor current which occurs during commutation can be avoided and the noise-free forwarding of the present values which is required for position finding and control for electrically operated parts can be ensured. Thus, the positions calculated by the motor model are also preferably corrected on the basis of the measurement characteristic and the reference characteristic.

Thus, the motor impedance can actually be determined at the startup time even before the static friction is overcome, since in this case the speed is still zero and there is no induced armature voltage present. Repeated recording of motor current and motor voltage allows the value of the motor impedance to be brought into line adaptively and allows errors to be reduced. Furthermore, a temperature-dependent and load-dependent motor-specific variable in the motor equation can be determined afresh after each commutation process and thus taken into account for the subsequent extrapolation of the influence of temperature and load on the motor equation. Should the operating period of the motor be relatively short then the motor-specific variable can also remain at the firmly prescribed value over the entire operating period, since in particular the thermal influence has a very much slower and weaker effect by comparison.

BRIEF DESCRIPTION OF THE DRAWINGS

The invention is explained in more detail below with reference to exemplary embodiments which are shown in the drawings, in which FIG. 3 shows a third voltage profile for a ripple component of the drive current in an electric motor, FIG. 4 shows a schematic illustration of a commutator in an electric motor, FIG. 6 shows an output signal from a threshold value switch.

DETAILED DESCRIPTION OF THE INVENTION

For optimum control, control apparatuses for adjusting devices in motor vehicles require the most accurate position finding for the part which is to be adjusted, for example a window pane for a motor vehicle window lifter. Normally, position finding involves the use of position measurement systems which take the drive movement of an electric motor in the adjusting device and calculate the present position. To this end, optical sensors or Hall sensors which sense the drive movement are used, for example.

In addition, mechanically commutated electric motors have a ripple in the drive current which is dependent on the commutation and which can be used for position finding. In this case, the number of ripple signals is dependent on the number of lamellae connected to the commutator in the electric motor. In this context, a ripple corresponds to a particular angle of rotation. To find the position, the identified ripples can be counted, for example. Such position finding methods are subject to a probability of error, since ripples are identified incorrectly or not at all, particularly when the drive is speeding up or slowing down. In the quiescent state too, incorrect ripples may occur if, by way of example, the adjusting apparatus is knocked. The position found by counting may therefore have been shifted with respect to the real position. Accordingly, the position found may have a positional error.

To correct this positional error, a reference characteristic of orderly ripple signals is evaluated in addition to counting the ripples. This reference characteristic $Ch_{ref}$ is associated with a reference position, so that the position found can be corrected on the basis of the reference characteristic $Ch_{ref}$ and the reference position, as explained below.

Figure 1:
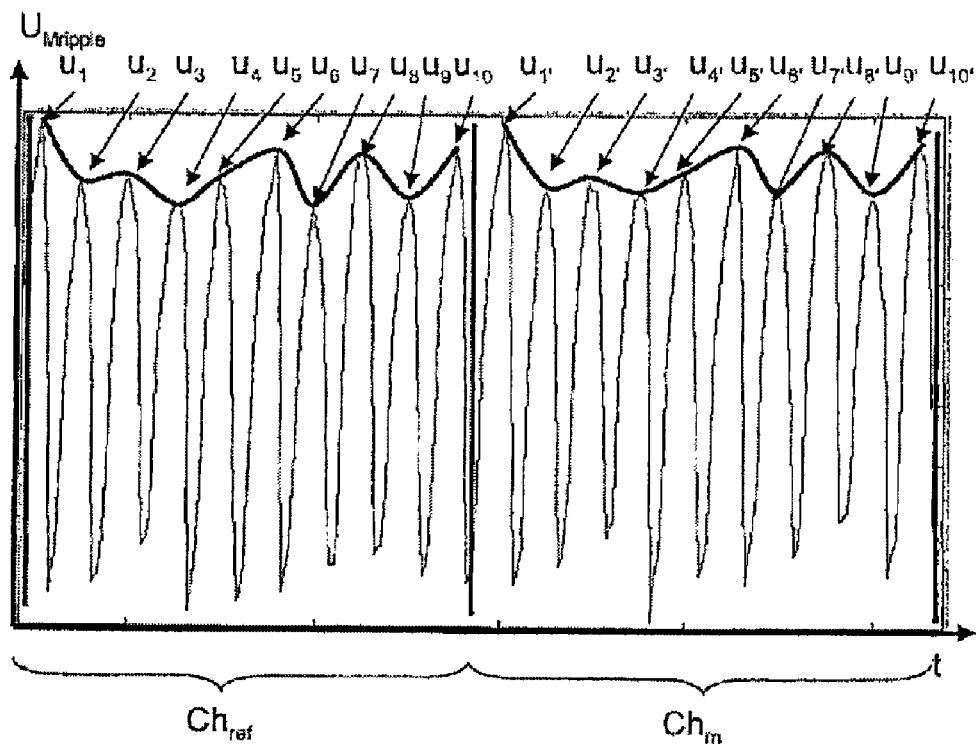
FIG. 1 shows a first voltage profile for a ripple component of the drive current in an electric motor.

FIG. 1 shows a first voltage profile $U_{Mripple}$ for a ripple component of the drive current in an electric motor. The voltage profile is obtained from a measuring resistor through which the motor current or part of the motor current flows. The voltage drop across this measuring resistor is shown plotted against time t in FIG. 1. The DC component of the motor current signal is not shown in FIG. 1 in order to improve clarity.

In the exemplary embodiment shown in FIG. 1, the values and the order of the peak voltage values U1 to U10 are determined, which are respectively associated with a lamella in a mechanically commutated electric motor. The time sequence of the peak voltage values U1 to U10 forms a characteristic profile which can be called a reference characteristic $Ch_{ref}$. In this exemplary embodiment, the length of this reference characteristic $Ch_{ref}$ can be associated with one full motor revolution. FIG. 1 shows a reference characteristic $Ch_{ref}$ with the peak voltage values U1 to U10 and a measurement characteristic $Ch_m$ with the peak voltage values U1' to U10', which come directly after one another to simplify the illustration.

The length both of the reference characteristic $Ch_{ref}$ and of the measurement characteristic $Ch_m$ in this case corresponds to one full motor revolution, which is in turn associated, by means of the mechanics, with an adjusting path length for the part of the adjusting device which is to be adjusted. Alternatively, characteristics for part of the motor revolution, for example a half motor revolution, may also be determined. The peak voltage values U1 to U10 or U1' to U10' are preferably determined by sampling this ripple $U_{Mripple}$ using analog-digital conversion and converting it into an arithmetic value and evaluating it.

The correction is made by comparing the measurement characteristic $Ch_m$ having the peak voltage values U1' to U10' with the reference characteristic $Ch_{ref}$ having the peak voltage values U1 to U10. This comparison is preferably made using cross-correlation. In this case, either all the voltage values U1 to U10 and U1' to U10' are cross-correlated to one another or groups of peak voltage values, for example U1, U3, U5, U7, U9 and U2, U4, U6, U8, U10 are combined and are cross-correlated to the relevant peak voltage values U1' to U10' of the measurement characteristic $Ch_m$ in succession. This can simplify cross-correlation and therefore requires less computation power.

As an alternative to comparing the peak voltage values U1 to U10 with U1' to U10', ratios for the peak voltage values U1/U2, U2/U5 etc. of the reference characteristic $Ch_{ref}$ are compared with ratios U1'/U2', U2'/U5' etc. for the measurement characteristic $Ch_m$. In this case, it is not necessary for the peak voltage values U1 to U10 to come after one another.

Besides the use of cross-correlation which is also possible in this case, comparison using single comparison of the values is also possible. In this case, the present values U1' to U10' are compared with the reference values U1 to U10 in order. In this case, the match between the values must be within a range. By way of example, the values must not differ from one another by more than 5%. Accordingly, the first check would be x1*U1<U1'<x2*U1, where x1=0.95 and x2=1.05. After that, the check is continued in the same way with U2 and U2'. If one of the voltages U1' to U10' is outside of this tolerance range of 5% then there is no match with the reference characteristic $Ch_{ref}$. If all the voltage values U1' to U10' are within this tolerance range then the reference characteristic $Ch_{ref}$, which can also be called a pattern, is deemed to be recognized.

Figure 2:
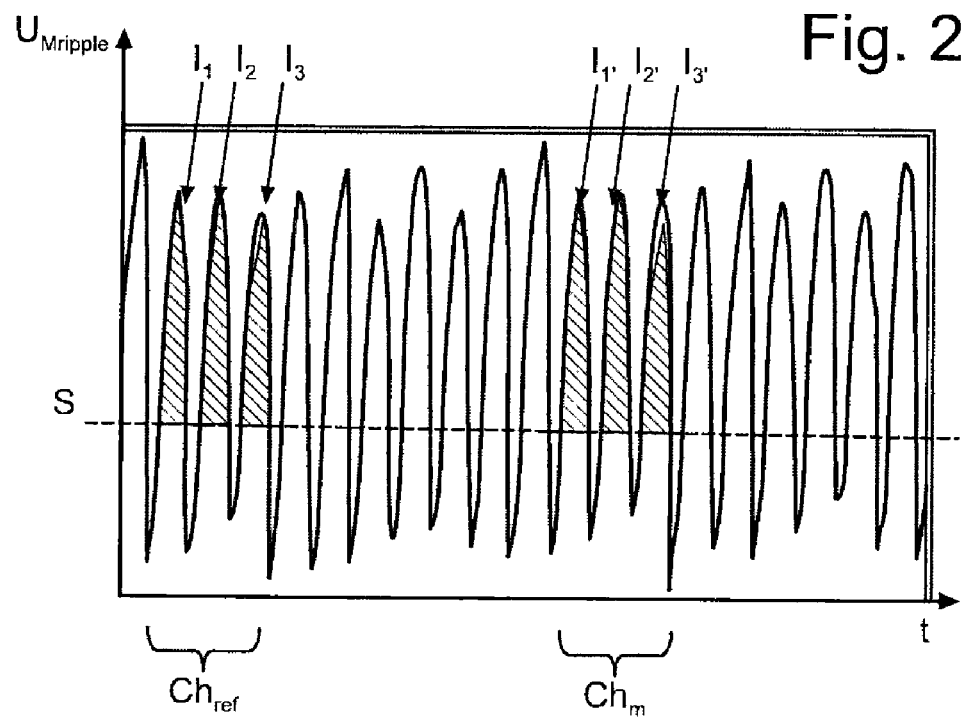
FIG. 2 shows a second voltage profile for a ripple component of the drive current in an electric motor.

FIG. 2 likewise shows a timing detail for a voltage profile $U_{Mripple}$ for a ripple in a measured drive current. In contrast to the exemplary embodiment in FIG. 1, the reference characteristic $Ch_{ref}$ in FIG. 2 is defined by three integral values I1, I2 and I3 which are determined by the area between a threshold value S or offset S and the profile of the ripple voltage $U_{Mripple}$. If the profile of the ripple voltage $U_{Mripple}$ exceeds the offset S then integration is performed, and if the profile of the ripple voltage $U_{Mripple}$ falls short of the offset then the integral value I1, I2 or I3 etc. is reset. The same applies for the integration for the measurement characteristic $Ch_m$ with the integral values I1', I2' and I3'.

For the comparison which follows, the integral values I1, I2 and I3 can in turn be cross-correlated to the integral values I1', I2' and I3'. As an alternative to or in combination with the integral values, the ratios I1 to I2 and I2 to I3, for example, of the integral values of the reference characteristic $Ch_{ref}$ are advantageously cross-correlated to the associated ratios I1' to I2' and I2' to I3' of the integral values of the measurement characteristic $Ch_m$.

FIG. 3 also shows a timing detail for a voltage profile $U_{Mripple}$ of a ripple in a measured drive current over time t. FIG. 3 is intended to explain the correction of the position found $x_m$ independently of the definition of the characteristics $Ch_{ref}$ and $Ch_m$, as were presented in the exemplary embodiments in FIGS. 1 and 2. First of all, a reference position $x_{ref}$, which in this exemplary embodiment has the count 103, has had a reference characteristic $Ch_{ref}$ associated with it. The subsequently measured values for the waveform of the measured voltage $U_{Mripple}$ are continually compared with this reference characteristic $Ch_{ref}$. In the exemplary voltage profile in FIG. 3, disturbances occur directly after the reference characteristic $Ch_{ref}$ which prevent a positive comparison result, so that no association is made with the reference characteristic $Ch_{ref}$.

It is not possible to make an association with the reference characteristic $Ch_{ref}$ again until at the position found $x_m$ 132. At this position $x_m$, the measurement characteristic $Ch_m$ can be associated with the reference characteristic $Ch_{ref}$. A check is subsequently performed to determine whether the position $x_m$=132 needs to be corrected. The reference characteristic $Ch_{ref}$ in the exemplary embodiment in FIG. 3 corresponds to one full motor revolution, with which a total of 10 voltage signals for the ripple in the drive current are associated, said voltage signals being able to be counted for the purpose of position finding. Since, when the measurement characteristic $Ch_m$ expires, one full motor revolution is again at an end, the distance between the position found $x_m$ and the reference position $x_{ref}$ can only be a multiple of the length of the reference characteristic $x_{ref}$ for the exemplary embodiment in FIG. 3. The length of the reference characteristic $x_{ref}$ is, as already mentioned above, 10 countable voltage signals. If three times the length 10 of the reference characteristic $Ch_{ref}$ is now deducted from the position found $x_m$=132 then the value 102 is obtained, which differs from the reference position $x_{ref}$=103 by a count. To correct the position found $x_m$, its value is subsequently therefore increased by 1 to 133.

An alternative calculation is possible through:

$k=(x_m-x_{ref})\mod 10$

If $0<k<5$, the present position $x_m$ is corrected by the numerator k in a particular direction of correction. In contrast, if $5<k<10$, a correction is made by $10-k$ in the opposite direction of correction.

This correction method is advantageously combined with further correction methods. Preferably, the position found $x_m$ is corrected if a detectable position within the adjusting path, for example a mechanical stop, is identified. Advantageously, the reference position $x_{ref}$ is also corrected. A correction developing the invention is also possible in combination if part of the mechanics of the adjusting device, particularly a gear, has a characteristic which can be detected over the adjusting path at particular intervals. By way of example, this characteristic is a restriction or ease of movement in the region of a tooth element on a gearwheel.

Figure 5:
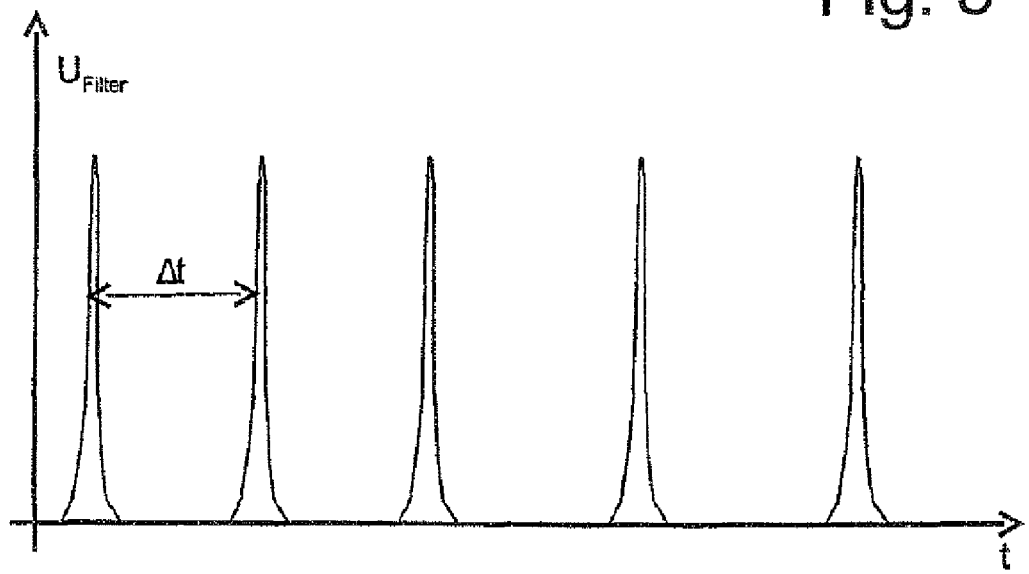
FIG. 5 shows an output signal from the high-pass filter.
Figure 7:
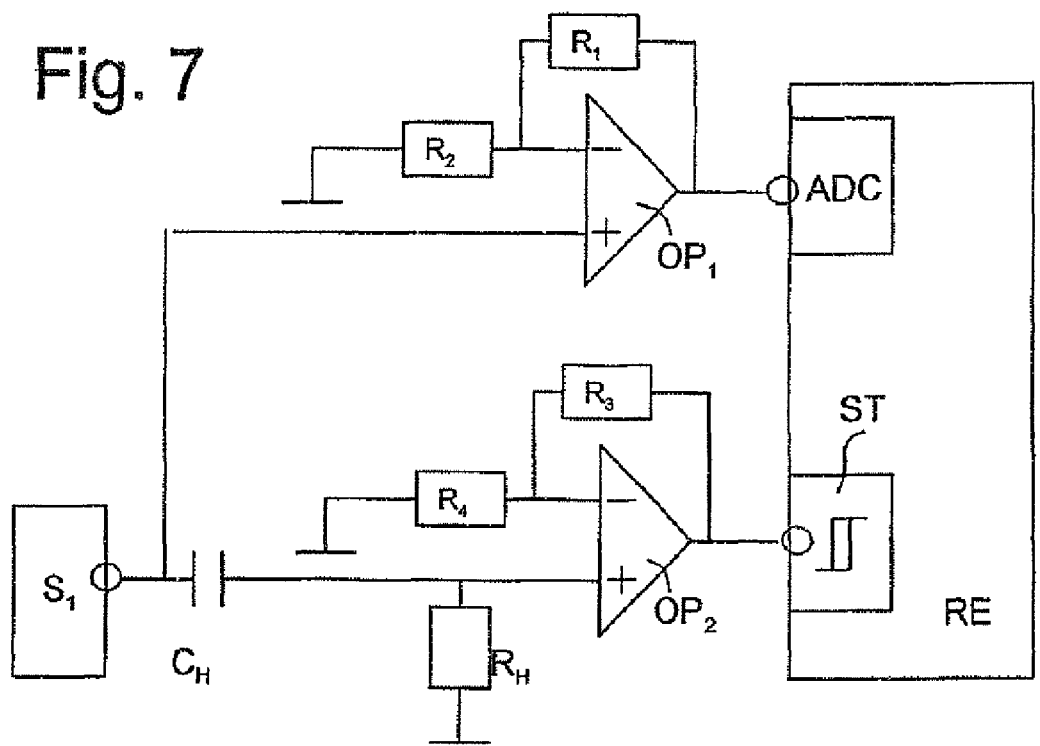
FIG. 7 shows a circuit detail for a control unit.

FIG. 7 shows part of a circuit for a control apparatus. The reference characteristic $Ch_{ref}$ and the measurement characteristic $Ch_m$ are determined differently from the determination in FIGS. 1 and 2. The ascertainment of the reference characteristic $Ch_{ref}$ and of the measurement characteristic $Ch_m$ using the circuit in FIG. 7 is explained in more detail with reference to FIGS. 4 and 5.

The circuit shown in FIG. 7 has a processor RE which, by way of example, is a microcontroller or an application specific integrated circuit (ASIC). This processor incorporates an analog-digital converter ADC and a Schmitt trigger ST, which convert analog input signals from the processor RE into digital values. As an alternative to the Schmitt trigger ST, it is also possible to use an interrupt timer input on a microcontroller. Both inputs are connected via further components to a current sensor S1, which outputs a voltage signal which is dependent on the motor current. The voltage signal is firstly passed via the high-pass filter, formed from the capacitor $C_H$ and the resistor $R_H$, to the operational amplifier $OP_2$, connected up as an inverter, to the Schmitt trigger input ST of the processor. Secondly, the voltage signal is passed via the operational amplifier $OP_1$, which is likewise connected up as an inverter, to the input of the analog-digital converter ADC in the processor RE.

The high-pass filter $C_H$, $R_H$ acts as a differentiator, which passes voltage changes caused by the ripple and filters out the slowly changing DC component of the voltage signal. The signal $U_{Filter}$, which now contains exclusively AC voltage components, is shown schematically in FIG. 5. To determine the measurement characteristic $Ch_m$, a respective time difference $\Delta t$ between the pulses shown is measured.

This output signal $U_{Filter}$ from the differentiator $C_H$, $R_H$ is converted into square-wave pulses, shown schematically in FIG. 6, by the Schmitt trigger ST. FIG. 6 shows 8 square-wave pulses. Each square-wave pulse has a respective associated time interval $\Delta t_1$ to $\Delta t_8$. In this case, the time intervals $\Delta t_1$ to $\Delta t_8$ have different lengths. In the exemplary embodiment shown in FIG. 6, a time interval $\Delta t_1$ to $\Delta t_8$ extends from a rising edge to the next rising edge of the next pulse. If an interrupt timer input of the microcontroller is used then the time interval $\Delta t_1$ to $\Delta t_8$ extends from one interrupt to the next. The time intervals $\Delta t_1$ to $\Delta t_8$ are orderly signals which in turn form a reference characteristic $Ch_{ref}$.

FIG. 4 is the schematic illustration of a commutator in an electric motor which is looped by the brushes (not shown in FIG. 4). The metal contacts on the commutator, which together with the brushes form the temporary electrical contact for the commutation, have different angular ranges $\phi_1$ to $\phi_8$ of the circumference of the commutator in this case. To improve visibility, the angular ranges $\phi_1$ to $\phi_8$ differ significantly from one another. For the desired functionality of an appropriate characteristic, however, an angle difference between $\phi_1$ to $\phi_8$ of less than 1° is sufficient. The angle differences $\phi_1$ to $\phi_8$ in FIG. 4 correspond to the time intervals $\Delta t_1$ to $\Delta t_8$ in FIG. 6. For correction, the procedure is again as in the description relating to FIG. 3, with the difference that the characteristics $Ch_{ref}$ and $Ch_m$ are determined from the time intervals $\Delta t_1$ to $\Delta t_8$ or from ratios for the time intervals $\Delta t_1$ to $\Delta t_8$.

To ascertain the characteristics $Ch_{ref}$ and $Ch_m$, manufacturing-tolerance-related differences between the metal contacts on the commutator or between the lamellae are sufficient. To improve the characteristic further, it is also advantageous to design the electric motor such, particularly to make the geometry of the metal contacts on the commutator such, that the characteristics $Ch_{ref}$ and $Ch_m$ are significantly more pronounced in order to improve evaluation and correction of the position found $x_m$.

LIST OF REFERENCE SYMBOLS $U_1, U_2, U_3, U_4, U_5, U_6, U_7, U_8, U_9, U_{10}, U_{1'}, U_{2'}, U_{3'}, U_{4'}, U_{5'}, U_{6'}, U_{7'}, U_{8'}, U_{9'}, U_{10'}$ Voltage value
$I_1, I_2, I_3, I_{1'}, I_{2'}, I_{3'}$ Integral value
$\phi_1, \phi_2, \phi_3, \phi_4, \phi_5, \phi_6, \phi_7, \phi_8$ Angle
$\Delta t_1, \Delta t_2, \Delta t_3, \Delta t_4, \Delta t_5, \Delta t_6, \Delta t_7, \Delta t_8, \Delta t$ Time interval
103, 132 Count
$U_{Mripple}$ Voltage of the ripple in a commutator motor current
t Time
S Threshold value, offset
$Ch_{ref}$ Reference characteristic
$Ch_m$ Measurement characteristic
$x_{ref}$ Reference position
$x_m$ Position found
$R_1, R_2, R_3, R_4, R_H$ Resistor
$C_H$ Capacitor
$OP_1, OP_2$ Operational amplifier, comparator
$S_1$ Current sensor, shunt resistor
RE Processor, microcontroller, ASIC
ADC Analog-digital converter
ST Schmitt trigger, window comparator
$U_{Filter}$ Output voltage from a differentiator

The invention claimed is:

1. A method for controlling an adjusting device in a motor vehicle, the method comprising:
identifying a position ($x_m$), which is found from a ripple in a motor current in the adjusting device;
associating a reference characteristic ($Ch_{ref}$) of orderly signals ($U_1$ to $U_{10}$, $I_1$ to $I_3$, $\Delta t_1$ to $\Delta t_8$) for the ripple with a reference position ($x_{ref}$); and
correcting the position found ($x_m$) on the basis of the reference characteristic ($Ch_{ref}$) and the reference position ($x_{ref}$), and
wherein the reference characteristic ($Ch_{ref}$) has ratios for voltage values ($U_1$ to $U_{10}$) and/or current values and/or integral values ($I_1$ to $I_3$) and/or time intervals ($\Delta t_1$ to $\Delta t_8$) for the orderly signals.

2. The method according to claim 1, further comprising:
comparing a present measurement characteristic ($Ch_m$) and the reference characteristic ($Ch_{ref}$), and
performing the correction if the present measurement characteristic ($Ch_m$) and the reference characteristic ($Ch_{ref}$) can be associated with one another by means of the comparison.

3. The method according to claim 2, wherein the measurement characteristic ($Ch_m$) and the reference characteristic ($Ch_{ref}$) are compared by cross-correlating them.

4. The method according to claim 3, wherein the measurement characteristic ($Ch_m$) and the reference characteristic ($Ch_{ref}$) can be associated with one another if a value for matches between the measurement characteristic ($Ch_m$) and the reference characteristic ($Ch_{ref}$) exceeds a particular threshold value.

5. The method according to claim 4, further comprising continually updating the reference characteristic ($Ch_{ref}$).

6. The method according to claim 5, wherein updating involves associated measurement characteristics ($Ch_m$) being aligned with the reference characteristic ($Ch_{ref}$).

7. The method according to claim 4, wherein the reference characteristic ($Ch_{ref}$) has a number of voltage values and/or current values, particularly of peak current values ($U_1$ to $U_{10}$) for the orderly signals and/or of transformed signals.

8. The method according to claim 1, wherein the reference characteristic ($Ch_{ref}$) has a number of integral values ($I_1$ to $I_3$) for the orderly signals.

9. The method according to claim 1, wherein the reference characteristic ($Ch_{ref}$) has a number of time intervals ($\Delta t_1$ to $\Delta t_8$) for the orderly signals.

10. The method according to claim 1, wherein the reference characteristic ($Ch_{ref}$) has a number of orderly signals which are associated with angle segment widths and which are verified by a full revolution.

11. The method according to claim 1 wherein the correction is made by overwriting the currently determined position value ($x_m$) in a register.

12. The method according to claim 1, wherein the position found ($x_m$) is corrected on the basis of the length of the characteristic.

13. The method according to claim 12, wherein the correction is made by reducing the distance between the position found ($x_m$) and the reference position ($Ch_{ref}$) by a multiple of the length of the characteristic, and shifting the position found ($x_m$) by the remaining difference.

14. The method according to claim 1, wherein the correction is made only in the event of a positive result from a plausibility check on at least the position found ($x_m$), the reference position ($x_{ref}$) and the length of the characteristic.

15. A control apparatus for an adjusting device in a motor vehicle, the apparatus comprising:
a sensor for generating signals;
a differentiating element designed to filter out the DC component of the sensors signal; and
a processor which is designed to
identify a position ($x_m$), which is found from a ripple in a motor current in the adjusting device;
associate a reference characteristic ($Ch_{ref}$) of orderly signals ($U_1$ to $U_{10}$, $I_1$ to $I_3$, $\Delta t_1$ to $\Delta t_8$) for the ripple with a reference position ($x_{ref}$); and
correct the position found ($x_m$) on the basis of the reference characteristic ($Ch_{ref}$) and the reference position ($x_{ref}$).

16. The control apparatus according to claim 15, wherein the sensor ($S_1$) is connected to an analog-digital converter (ADC) such that the unfiltered sensor signal can be evaluated by the processor (RE).

17. The control apparatus according to claim 15, wherein the differentiating element is a high-pass filter or ($R_H, C_H$) or a bandpass filter.

18. A control apparatus for an adjusting device in a motor vehicle, the apparatus comprising:
a sensor, particularly a current sensor ($S_1$), for generating a signal ($U_1$ to $U_{10}$, $I_1$ to $I_3$, $\Delta t_1$ to $\Delta t_8$) which is dependent on a motor movement by a motor in the adjusting device;
a power driver for controlling a motor current;
a differentiating element designed to filter out the DC component of the sensor signal; and
a processor (RE) which is designed and set up
to find a position ($x_m$) from the sensor signal ($U_1$ to $U_{10}$, $I_1$ to $I_3$, $\Delta t_1$, to $\Delta t_8$) from the ripple in the motor current;

to associate a reference characteristic ($Ch_{ref}$) of orderly signals ($U_1$ to $U_{10}$, $I_1$ to $I_3$, $\Delta t_1$ to $\Delta t_8$) from the sensor for the ripple with a reference position ($x_{ref}$);

to correct the position found ($x_m$) on the basis of the reference characteristic ($Ch_{ref}$) and the reference position ($x_{ref}$), and to control the motor current on the basis of the corrected position.

19. The control apparatus according to claim 18, wherein the sensor ($S_1$) is connected to an analog-digital converter (ADC) such that the unfiltered sensor signal can be evaluated by the processor (RE).

20. The control apparatus according to claim 18, wherein the differentiating element is a high-pass filter or ($R_H$, $C_H$) or a bandpass filter.

* * * * *